（12） United States Patent
Nikou et al.

(10) Patent No.: US 12,512,586 B2
(45) Date of Patent: Dec. 30, 2025

(54) UE DRIVEN ANTENNA TILT

(71) Applicant: Telefonaktiebolaget LM Ericsson (publ), Stockholm (SE)

(72) Inventors: Alexandros Nikou, Danderyd (SE); Konstantinos Vandikas, Solna (SE); Swarup Kumar Mohalik, Bangalore Karnataka (IN); Kaushik Dey, Kolkata (IN); Lackis Eleftheriadis, Valbo (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 418 days.

(21) Appl. No.: 18/036,854

(22) PCT Filed: Oct. 14, 2021

(86) PCT No.: PCT/EP2021/078409
§ 371 (c)(1),
(2) Date: May 12, 2023

(87) PCT Pub. No.: WO2022/100952
PCT Pub. Date: May 19, 2022

(65) Prior Publication Data
US 2023/0420838 A1    Dec. 28, 2023

(30) Foreign Application Priority Data
Nov. 13, 2020  (IN) .............................. 202041049682

(51) Int. Cl.
*H01Q 3/04* (2006.01)
*H04W 16/28* (2009.01)
(52) U.S. Cl.
CPC .............. *H01Q 3/04* (2013.01); *H04W 16/28* (2013.01)
(58) Field of Classification Search
CPC ................................ H01Q 3/04; H04W 16/28
See application file for complete search history.

(56) References Cited

U.S. PATENT DOCUMENTS

2020/0053591 A1    2/2020  Prasad

FOREIGN PATENT DOCUMENTS

| CN | 109 444 813 A | 3/2019 |
| CN | 110 726 970 A | 1/2020 |

(Continued)

OTHER PUBLICATIONS

International Search Report and Written Opinion with Transmittal dated Feb. 3, 2022 issued in International Patent Application No. PCT/EP2021/078409 (22 pages).

(Continued)

*Primary Examiner* — Henry Luong
(74) *Attorney, Agent, or Firm* — Rothwell, Figg, Ernst & Manbeck, P.C.

(57) ABSTRACT

The present disclosure relates to a method of a wireless communication device (103) of facilitating control of antenna tilt for a radio base station (101), a method of a radio base station (101) of facilitating control of antenna tilt at the radio base station (101) and further a wireless communication device (103) and a radio base station (101) performing the respective method. In a first aspect a method of a wireless communication device (103) of facilitating control of antenna tilt for a radio base station (101) is provided. The method comprises receiving (S202), from the radio base station (101), information indicating a location of the radio base station (101), determining (S203) a set of values of a measure of quality of a signal received from the radio base station and a distance of the wireless communication device (103) from the location of the radio base station (101) at which each value in the set is determined, supplying (S204) a machine learning model with the determined set of values of said measure of quality and the distance of the wireless communication device (103) from the location of the radio base station (101) for each value, thereby creating a trained (Continued)

machine learning model associating a distance of the wireless communication device (101) from the location of the radio base station (103) with a value of a measure of quality of a signal received from the radio base station (101), and transmitting (S205) the trained machine learning model to the radio base station (103), the trained machine learning model being used by the radio base station (101) to control antenna tilt.

20 Claims, 3 Drawing Sheets

(56) References Cited

FOREIGN PATENT DOCUMENTS

| | | |
|---|---|---|
| CN | 111 405 586 A | 7/2020 |
| WO | 2020/015379 A1 | 1/2020 |
| WO | 2020/064134 A1 | 4/2020 |

OTHER PUBLICATIONS

Chakraborty, S. et al., "Learning from Peers at the Wireless Edge", 2020 International Conference On Communication Systems & Networks (COMSNETS), IEEE, Jan. 7, 2020, XP033731519 (6 pages).

Zappone, A. et al., "Wireless Networks Design in the Era of Deep Learning: Model-Based, AI-Based, or Both?", IEEE Transactions On Communications, IEEE Service Center, Piscataway, NJ. USA, vol. 67, No. 10, Oct. 1, 2019, XP011750538 (46 pages).

Samarakoon, S. et al., "Distributed Federated Learning for Ultra-Reliable Low-Latency Vehicular Communications", Arxiv.org, Cornell University Library, arXiv: 1807.08127v3 [cs.IT], Jul. 21, 2018, XP081557197 (14 pages).

Balevi, E. et al., "Online Antenna Tuning in Heterogeneous Cellular Networks with Deep Reinforcement Learning", arXiv:1903.06787v2 [cs.LG], Jun. 17, 2019 (32 pages).

ETSI TS 125 463 V6.0.0, Sep. 2004, Technical Specification, Universal Mobile Telecommunications System (UMTS); Utran luant interface: Remote Electrical Tilting (RET) antennas Application Part (RETAP) signalling (3GPP TS 25.463 version 6.0.0 Release 6) (39 pages).

UE DRIVEN ANTENNA TILT

CROSS REFERENCE TO RELATED APPLICATIONS

This application is a 35 U.S.C. § 371 National Stage of International Patent Application No. PCT/EP2021/078409, filed Oct. 14, 2021, which claims priority to Indian Application No. 202041049682, filed Nov. 13, 2020, which is incorporated by this reference.

TECHNICAL FIELD

The present disclosure relates to a method of a wireless communication device of facilitating control of antenna tilt for a radio base station, a method of a radio base station of facilitating control of antenna tilt at the radio base station and further a wireless communication device and a radio base station performing the respective method.

BACKGROUND

In wireless communications networks, antenna tilting is commonly used by radio base stations (RBSs) to aim a main lobe of an antenna either in an upwards or a downwards direction. This is performed in order to e.g. reduce interference or increase coverage in a specific area served by the antenna.

Mechanically tilting an antenna thus changes coverage provided by the RBS and must be carefully considered. In some cases, the adjustment of antenna even requires permission, and should therefore occur infrequently.

SUMMARY

One objective is to make available an improved method of facilitating control of antenna tilt for a radio base station This objective is attained in a first aspect by a method of a wireless communication device of facilitating control of antenna tilt for a radio base station. The method comprises receiving, from the radio base station, information indicating a location of the radio base station, determining a set of values of a measure of quality of a signal received from the radio base station and a distance of the wireless communication device from the location of the radio base station at which each value in the set is determined, supplying a machine learning model with the determined set of values of said measure of quality and the distance of the wireless communication device from the location of the radio base station for each value, thereby creating a trained machine learning model associating a distance of the wireless communication device from the location of the radio base station with a value of a measure of quality of a signal received from the radio base station, and transmitting the trained machine learning model to the radio base station, the trained machine learning model being used by the radio base station to control antenna tilt.

This objective is attained in a second aspect by a wireless communication device configured to facilitate control of antenna tilt for a radio base station, the wireless communication device comprising a processing unit and a memory, said memory containing instructions executable by said processing unit, whereby the wireless communication device is operative to receive, from the radio base station, information indicating a location of the radio base station, determine a set of values of a measure of quality of a signal received from the radio base station and a distance of the wireless communication device from the location of the radio base station (101) at which each value in the set is determined, supply a machine learning model with the determined set of values of said measure of quality and the distance of the wireless communication device from the location of the radio base station for each value, thereby creating a trained machine learning model associating a distance of the wireless communication device from the location of the radio base station with a value of a measure of quality of a signal received from the radio base station, and to transmit the trained machine learning model to the radio base station, the trained machine learning model being used by the radio base station to control antenna tilt.

This objective is attained in a third aspect by a method of a radio base station of facilitating control of antenna tilt at the radio base station. The method comprises transmitting, to a selected group of wireless communication devices served by the radio base station, information indicating a location of the radio base station, receiving, from each of at least a subset of the wireless communication devices in the group, a trained machine learning model associating a distance of said each wireless communication device from the location of the radio base station with a value of a measure of quality of a signal received from the radio base station at said each wireless communication device, and to aggregate the received trained machine learning models into a single trained machine learning model, which single trained machine learning model is used to control antenna tilt at the radio base station.

This objective is attained in a fourth aspect by a radio base station configured to facilitate control of antenna tilt at the radio base station, the radio base station comprising a processing unit and a memory, said memory containing instructions executable by said processing unit, whereby the radio base station is operative to transmit, to a selected group of wireless communication devices served by the radio base station, information indicating a location of the radio base station, receive, from each of at least a subset of the wireless communication devices in the group, a trained machine learning model associating a distance of said each wireless communication device from the location of the radio base station with a value of a measure of quality of a signal received from the radio base station at said each wireless communication device, and to aggregate the received trained machine learning models into a single trained machine learning model, which single trained machine learning model is used to control antenna tilt at the radio base station.

Advantageously, a model is created taking into account movement, and experienced quality of received signals, of wireless communication devices being served by a radio base station, which model is trained using machine learning (ML) with large amounts of data to serve as a basis for controlling antenna tilt at the radio base station.

In some embodiments, the information received by the wireless communication device further comprises one or more of information indicating type of machine learning model being utilized, information indicating feature space of the machine learning model being utilized, information indicating amount of resources to be allocated by the wireless communication device when training the machine learning model.

In some embodiments, the feature space further includes model type for the wireless communication device.

In some embodiments, the measure of quality being one of signal-to-interference-plus-noise ratio (SINR), signal-to-noise ratio (SNR), Quality of Service (QoS), Channel Quality Indicator (CQI), Reference Signal Received Quality (RSRQ) and Reference Signal Received Power (RSRP).

In some embodiments, the radio base station is further operative to compute, utilizing the single trained machine learning model, an expected value of the measure of quality of a signal received from the radio base station by a wireless communication device at a particular distance from the radio base station, determine whether or not the computed expected value exceeds a minimum threshold value for said measure of quality, and if not to change tilt of the antenna of the radio base station.

In some embodiments, the radio base station is further operative to receive a response from one or more wireless communication devices indicating whether or not a value of the measure of quality of the signal received from the radio base station upon changing the tilt of the antenna exceeds the minimum threshold value for said measure of quality, and if not to change tilt of the antenna of the radio base station until a response is received indicating that the value of the measure of quality of the signal exceeds the minimum threshold value.

In some embodiments, the radio base station is further operative to select the group of wireless communication devices served by the radio base station to which information indicating a location of the radio base station is to be transmitted, the group being selected to comprise any one or more of: a selected number of wireless communication devices being in Radio Resource Control (RRC) connected state for a longest total time with the radio base station, wireless communication devices being located within a maximum allowable distance from each other, wireless communication devices having a particular Service Level Agreement (SLA) status, wireless communication devices being located closer to the radio base station as compared to another set of wireless communication devices, or wireless communication devices accessing a particular service.

In some embodiments, the radio base station is further operative to effect handover of a group of wireless communication devices not located within coverage of the antenna to another antenna of the radio base station or to a neighbouring radio base station.

In some embodiments, the radio base station is further operative to acquire a trained reinforcement learning model created during simulation, the reinforcement learning model created during simulation being trained to produce as output a value of the measure of quality of a signal received by a wireless communication device located on a particular distance from the radio base station.

This objective is attained in a fifth aspect by a computer program comprising computer-executable instructions for causing a wireless communication device to perform steps recited in the method of the first aspect when the computer-executable instructions are executed on a processing unit included in the wireless communication device.

This objective is attained in a sixth aspect by a computer program product comprising a computer readable medium, the computer readable medium having the computer program according to the fifth aspect embodied thereon.

This objective is attained in a seventh aspect by a computer program comprising computer-executable instructions for causing a radio base station to perform steps recited in the method of the third aspect when the computer-executable instructions are executed on a processing unit included in the radio base station.

This objective is attained in a eighth aspect by a computer program product comprising a computer readable medium, the computer readable medium having the computer program according to the seventh aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
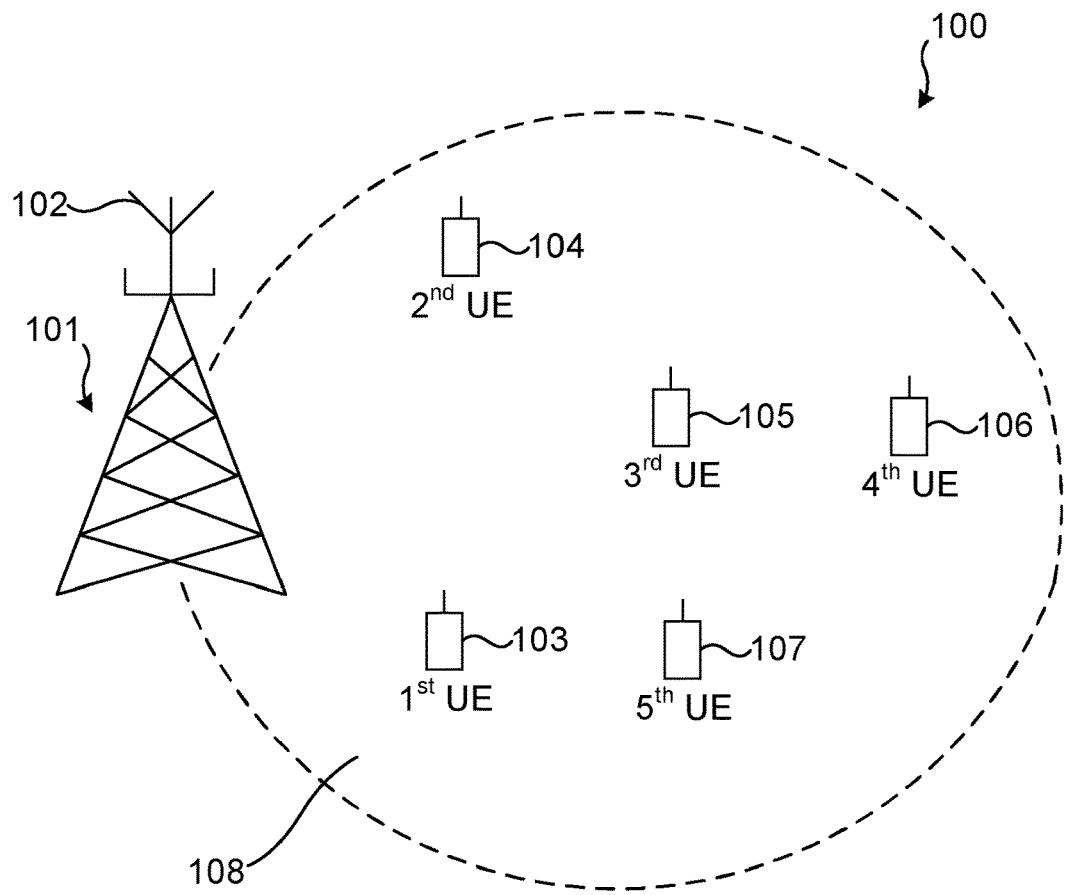
FIG. 1 shows a wireless communications network comprising a radio base station equipped with a tiltable antenna, and a group of wireless communication devices served by the radio base station.

FIG. 1 illustrates a wireless communications network 100 comprising a radio base station (RBS) 101 equipped with at least one tiltable antenna 102, and a group of wireless communication devices 103-107 served by the RBS 101. The wireless communication devices 103-107 are commonly referred to as User Equipment (UE). It is noted that in practice, an RBS may serve hundreds or even thousands of UEs.

In $3^{rd}$ generation (3G) Universal Mobile Telecommunications System (UMTS), the RBS is typically referred to as a NodeB, in 4th generation (4G) Long Term Evolution, the RBS is typically referred to as an Evolved Node B (eNodeB), while in $5^{th}$ generation (5G) New Radio (NR), the RBS is typically referred to as a gNodeB ("Next Generation NodeB").

The UEs may be embodied e.g., by smart phones, tablets, gaming consoles, connected vehicles, etc.

Now, the RBS 101 performs tilting of the antenna 102 relatively seldom, such as e.g., a couple of times every day, depending on how the UEs 103-107 are geographically deployed in a cell 108 served by the RBS 101.

It is desirable to find a model of how a measure of quality experienced by a UE for a signal received from the RBS 101 varies with the location of the UE in the cell 108 in order to determine how and when the antenna 102 should be tilted. For instance, the RBS 101 would benefit from having access to a model—created by means of using machine learning (ML)—indicating the measure of quality to be expected for a UE at a certain location in the cell 108.

It is noted that in practice, antenna tilting is only performed if a large group of UEs indicates that tilting is beneficial, and is not a decision taken on the basis of a few individual UEs. Therefore, careful consideration must be made before performing an antenna tilt.

This measure of quality for a received signal may be represented e.g., by signal-to-interference-plus-noise ratio (SINR) or signal-to-noise ratio (SNR) of the received signal, or other measures of quality such as Quality of Service (QoS), Channel Quality Indicator (CQI), Reference Signal Received Quality (RSRQ), Reference Signal Received Power (RSRP), etc. In the following exemplifying embodiments, this measure of quality of the received signals will be represented by SINR.

Figure 2:
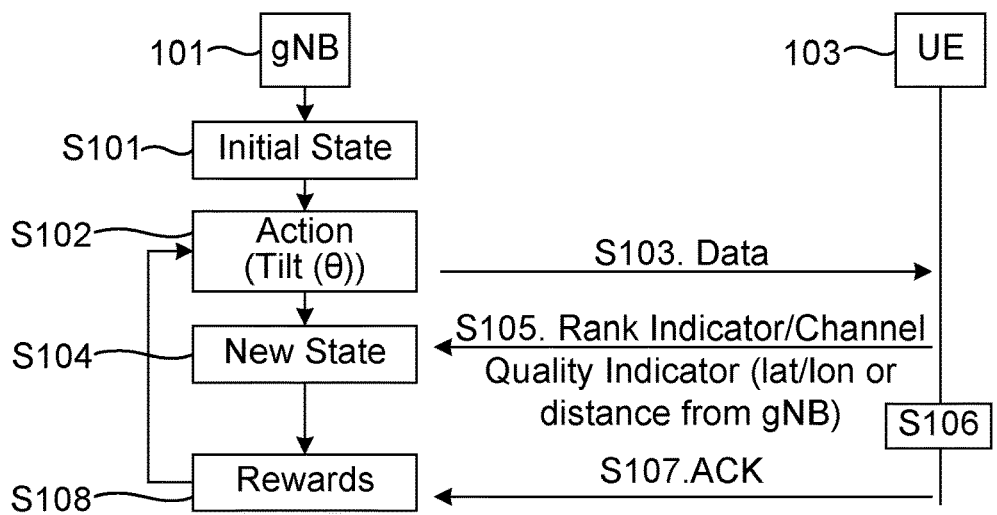
FIG. 2 a model created and trained in a simulation environment using for example a reinforcement learning (RL) algorithm, which model associates a measure of quality of a signal received by a wireless communication device with the location of the wireless communication device.

FIG. 2 shows such a model created and trained in a simulation environment using for example a reinforcement learning (RL) algorithm supplied with field data collected from the wireless communications network 100 of FIG. 1.

As will be discussed in more detail in the following, this model created during simulation may serve as a starting point for the RBS 101 upon creating a real-world model in collaboration with the UEs 103-107. The measure of quality will be embodied in the form of SINR even though anyone, or a combination, of the above-mentioned measures may be used.

In the simulation model of FIG. 2, the RBS receives—for different configurations of antenna tilt and transmission power of signals sent from the RBS 101—information regarding:

SINR experienced by a UE receiving a signal at a particular location in the cell, i.e., first UE 103 experiences SINR_1 at location_1 for configuration_1, second UE 104 experiences SINR_2 at location_2 for configuration_1, etc.

If for instance a recurrent neural network (RNN) would be used instead of RL, a sequence of previously acquired SINRs is utilized to make a prediction for the next n SINRs during a time period.

In FIG. 2, the RBS 101 starts in step S101 in an appropriate initial state which for instance may have been derived from historical data or simulation.

Thereafter, the RBS 101 selects in step S102 a particular configuration for antenna tilt and power of the signal to be transmitted to the first UE 103. As is understood, a higher signal transmission power would typically result in a higher SINR experienced by the first UE 103 for the received signal, but would also undesirably result in a higher RBS energy consumption.

After having selected a particular configuration, e.g., configuration_1, the signal is transmitted by the RBS 101 to the first UE 103 utilizing the selected configuration in step S103, after which the RL algorithm enters a new state in step S104 following the selection of configuration_1.

Upon receiving the signal in step S103, the first UE 103 returns its location in the cell 108 to the RBS 101 in step S105. This information may be more or less detailed, for instance by returning data indicating longitude/latitude or Global Positioning System (GPS) coordinates of the first UE 103 or just a distance from the RBS 101.

As is understood, the first UE 103 may optionally return other data in step S104, such as Rank Indicator (RI) indicating how well the antennas of the RBS 101 interwork in case multiple antennas are used, or a Channel Quality Indicator (CQI) indicating the level of quality of the channel between the RBS 101 and the first UE 103. Generally, the more information the RBS 101 has access to, the more qualified the antenna tilt configuration selection can be.

Further, the first UE 103 determines in step S106 whether or not the SINR experienced by the first UE 103 for the received signal exceeds a required threshold value T, and if so, sends an acknowledgement (ACK) signal in return to the RBS 101 in step S107.

The RBS 101 is thus provided with an indication of the SINR experienced by the first UE 103 by means of the ACK received in step S107. In this example, the RBS 101 is not provided with an explicit numeric value, but is implicitly made aware that the SINR at least exceeds value T. Alternatively, the RBS 101 derives a SINR value from the CQI in step S104 or even receives a SINR value in step S104.

Over time, the RL algorithm rewards itself in step S108 every time an ACK is received for a transmitted signal, and will thus learn which antenna tilt configurations are successful and which configurations are not.

Thus, as is common for RL algorithms, an RL model is trained by interacting with its simulated environment and based on a reward function the RL model builds up a learning of optimal actions that yields highest cumulative reward over a time period.

Thus, the RBS 101 will with the RL simulation algorithm illustrated in FIG. 2 acquire an association between (a) antenna tilt configuration, (b) SINR experienced by the first UE 103 at a specific location in the form of a trained RL model. This may be simulated for many different antenna tilt configurations and UE locations in the cell 108.

From the simulated RL model, the RBS 101 may conclude that if a certain number of UEs are served in the cell 108 and spread over the cell 108 in a certain manner, configuration_1 is preferably to be used for the antenna tilt, while if a different number of UEs are served in the cell 108 and deployed in the cell 108 in a certain manner, configuration_2 is to be utilized, and so on.

A problem with simulation is that the RL model cannot take into account all possible real-life scenarios. The association between the antenna tilt configuration of the RBS 101 and the SINR of a UE in a particular location depends heavily on signal propagation conditions between the RBS 101 and the UE, i.e., signal decay or attenuation due to weather conditions such as clouds or rain, interference from neighbouring cells, whether the signal travels directly from the RBS 101 to the UE or is subjected to reflections, etc.

Further, in a practical real-life scenario, the users of the UEs 103-107 are not necessarily inclined to share their positions with the RBS 101 for reasons of privacy; positional data is commonly perceived as sensitive from a user's point of view.

Thus, while the trained RL model created with the RL simulation algorithm described above with reference to FIG. 2 advantageously may be used as a starting point for determining a particular antenna tilt configuration, a model taking into account real-life conditions will have to be created.

Figure 3:
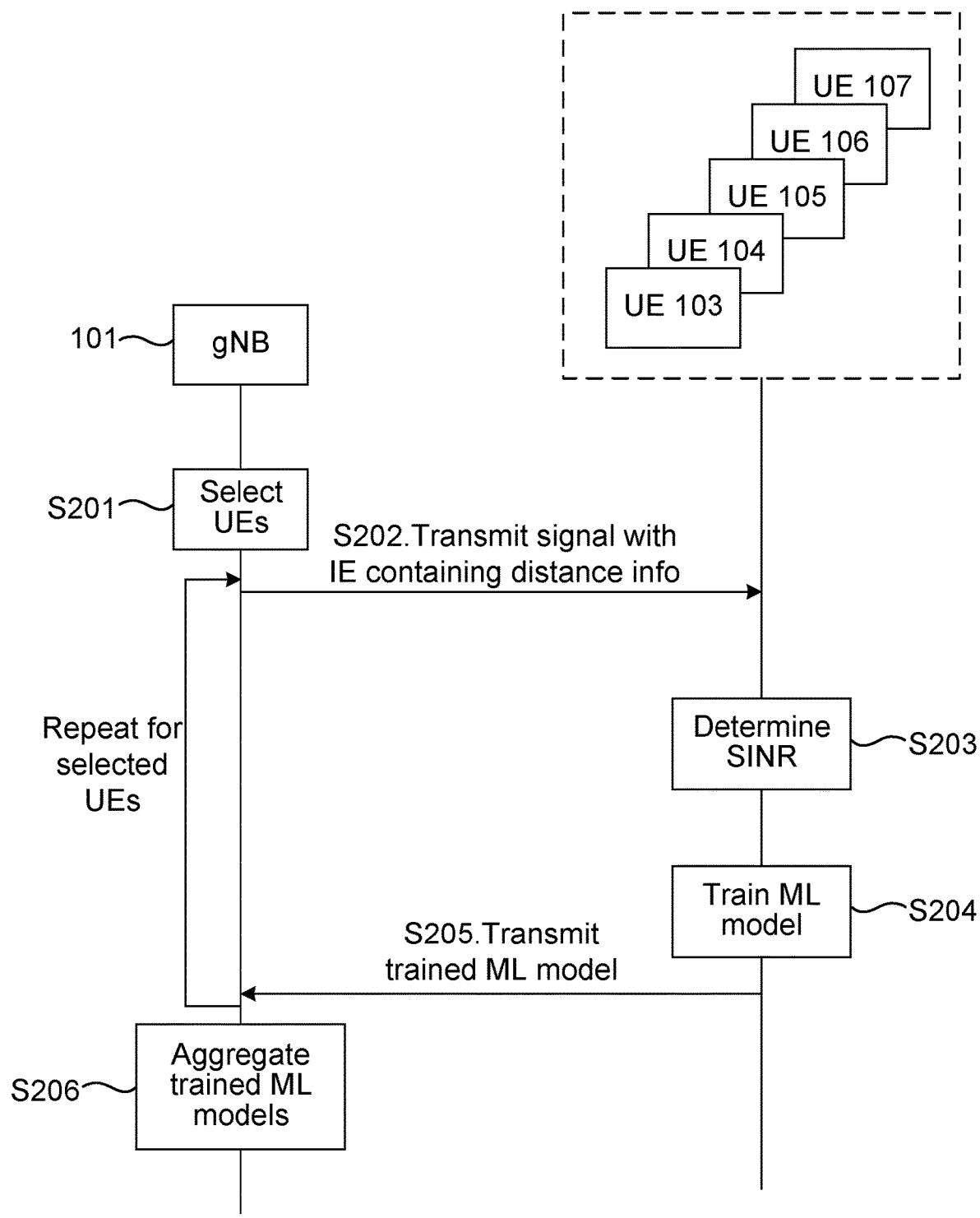
FIG. 3 shows a flowchart illustrating a method of creating an ML model for facilitating control antenna tilt of a radio base station according to some embodiments.

FIG. 3 shows a flowchart illustrating a method of creating a model for facilitating control antenna tilt of the RBS 101 according to an embodiment.

In a first step S201, the RBS 101 selects one or more UEs to which data is to be transmitted for creating the model for controlling tilt of the antenna 102.

Now, since the RBS 101 may serve hundreds or even thousands of UEs, a subset is typically selected, such as the five UEs 103-107. As previously mentioned, antenna tilt and possibly signal transmission power typically do not change dynamically (in certain cases such adjustment even requires permission, thereby occurring infrequently), so the SINR of slow-moving and relatively static UEs is typically interesting, for instance in the form of UEs held by users living in the particular area formed by the cell 108.

Starting for instance with the first UE 103 selected by the RBS 101 in step S201, the RBS transmits a signal in step S202 for which the first UE 103 will measure the SINR upon reception. Further, the RBS 101 includes in the transmitted signal an information element (IE) item comprising information required by the first UE 103 to train an ML model as will be described in the following.

The IE may include a number of elements used by the first UE 103 to train its ML model to subsequently be supplied to the RBS 101 as listed in the following.

"model_type". This element indicates the ML model and architecture being used (it may be possible to use different types of ML models and parameters of each ML model), e.g. random forest tree regression or neural network regression.

In the case of a neural network being utilized, a small feed forward neural network may for instance be considered with two input features, one hidden layer (comprising e.g., 32 neurons) and one output. The hyper parameters in the case of neural network could include batch size, number of epochs, optimizer algorithm, learning rate, etc. In the case of random forest tree, one example would be the depth of the tree. Other machine learning models apply such as xgboost. It should be noted that the model_type element is optional, as the RBS 101 and the UEs already may have agreed on a system level on the ML model to use along with appropriate hyper parameters.

"feature_space". This element contains a list of features which will be used by the first UE 103 to train the ML model.

As discussed with reference to FIG. 2, one feature being used is distance, i.e., the distance between the RBS 101 and the first UE 103, while a target variable is SINR. A further optional feature is device type. That is, different types or brands of UEs (such as Samsung and iPhone) may experience different SINRs. In other words SINR=f(distance, device type). Further features may be envisaged upon determining SINR, e.g. activity of a UE or information from an accelerometer of a UE to determine how the user is holding the UE when the antenna of the UE is recording SINR. Alternatively, bearing of a UE may be used as feature instead of distance.

"location_of_rbs". As the name implies, this element comprises information indicating the location of the RBS 101.

As previously mentioned, a problem to overcome is that the RBS 101 for privacy reasons cannot be supplied with information indicating the position of the UEs. Therefore, the location of the RBS 101 is provided to each of the UEs which thus is able to determine its distance from the RBS 101 (or even an exact position with respect to the RBS 101).

The first UE 103 is tasked to collect records of (SINR, distance) at different points in time as discussed in connection to the "feature_space" element. If the UE does not have enough such records, it will not instantly train its ML model but instead collect a required number of records, while the RBS 101 in the meantime will select another UE (such as the second UE 104). When the first UE 103 has collected enough samples, it may be selected again at a later point in time to contribute to the collaborative training process including the five UEs 103-107.

budget(hyper_parameters). This element indicates to the first UE 103 how much resources should be allocated by the first UE 103 when training the ML model.

For instance, budget(hyper_parameters) may indicate how mush processing power to be used in terms of e.g., how much central processing unit (CPU) resources is to be used or how much random access memory (RAM) resources is to assigned, amount of time being spent on the training, when to terminate the training in a scenario where the first UE 103 has not been able to produce an adequate model, etc. Similar to the model_type element, the budget(hyper_parameters) element is optional, since it already may have been set on a system level, wherein the UEs are aware of how much resources to allocated upon training the ML model.

Thus, the first UE 103 will in step S203 measure a number of SINR values and—based on the received information indicating the location of the RBS 101—record its position for each measured SINR value.

In step S204, the first UE 103 trains its ML model by supplying the measured SINR values and the corresponding distances to the ML model, potentially taking into account the particular device type of the UE (Samsung®, iPhone®, etc.) thereby creating a trained ML model:

$$f(distance, device\_type) \Rightarrow SINR$$

Thereafter, the first UE 103 will transmit the trained ML model to the RBS 101 in step S205.

The RBS 101 will thus have access to an ML model where the RBS 101 can input a distance value (and optionally device type) and receive as output an expected SINR value computed by received and trained ML model. In other words, the RBS 101 receives in step S205 a trained ML model associating a distance of the first UE 103 from the location of the RBS 101 with a value of a measured SINR for a signal received from the RBS 101.

In the case of a neural network, the trained ML model may comprise an array of hyperparameters, while in the case of random forest tree the trained ML model may comprise an array of estimators (xgboost and other ML models have their esoteric representation).

Now, in an embodiment, the RBS 101 will after having received the trained ML model from the first UE 103 perform steps S202-S204 for the second UE 104 and so on until having worked through all the UEs selected in step S201, i.e. in this example all five UEs 103-107.

The RBS 101 will aggregate the five received trained ML models into a single trained ML model in step S206, which subsequently will be used to control antenna tilt at the RBS 101. Advantageously, the UEs 103-107 will thus collaboratively train the ML model provided to the RBS 101 which allows the ML model to be trained using a great amount of data which will result in a more accurate ML model. This is commonly referred to as federated or collaborative learning.

It is noted that the aggregation of trained ML models into a single trained model alternatively may be performed by some other appropriate node other than the RBS 101, such as a core network node or even in a cloud configuration. Such node may then instruct the RBS 101 how to perform the antenna tilting.

In the case of neural networks, the aggregation of trained ML models may be performed using a process called Federated Averaging. In the case of random forest tree, a stacking process may be performed where all trained ML models are combined into a single ML model.

Advantageously, since the UEs each return a trained ML model to the RBS 101 from which the RBS 101 can compute an expected SINR value for a particular UE distance, privacy of the users of the UEs are preserved; no distance or position data of the UEs 103-107 is provided to the RBS 101.

In the described embodiment, the measure of quality of a received signal is represented by SINR. As previously mentioned, any appropriate measure of quality may be utilized such as SNR, QoS, CQI, RSRQ, RSRP, etc.

It should be noted that the RBS 101 typically is equipped with a plurality of antennas, where an ML model is created and trained for each antenna. Over time the ML models may have to be retrained in case something has changed in the environment (e.g. a new building has been raised and/or more people has moved into the area).

In an embodiment, when selection is made in step S201 of a group of UEs to use for the collaborative training of the ML model, the UEs being most frequently in connected state over Radio Resource Control (RRC) protocol with the RBS 101 is selected. For instance, on a daily basis, the RBS 101 checks the total time during which each UE has been in connected state. For instance, out of all UEs served by the RBS 101, a top k UEs in terms of duration in RRC connected state is selected to participate in the training of the ML model.

In another embodiment, when selection is made in step S201, a clustering approach is utilized where a cluster of UEs served by the RBS 101 is selected.

In a further embodiment, a further subset of UEs may be selected from the selected cluster if for instance the selected cluster is considered to be too large.

When categorizing a group of UEs into a cluster, a number of parameters may be considered such as location and time of day or week. For instance, in a mall there are more people at non-office hours and at weekends, while in an area mostly hosting enterprises there are a large group of users at office hours, but almost no one in evenings and weekends. In another example, a football stadium may regularly host a great number of users on e.g., Wednesdays and Sundays between 7 and 10 pm, but quite few outside of these periods (with the exception of occasional concerts and similar events, which may be timely anticipated).

Now, in a cluster such as a mall, an office or a football stadium, since the users are physically relatively close to each other (as compared for instance to a rural area), they will experience more or less the same or at least a similar SINR, while users in a neighbouring cluster may experience a rather different SINR.

When categorizing a group of UEs into a cluster, the UEs should not be too far located from each other in the cluster since that potentially will have as a result that a plurality of UEs in the same cluster will experience great differences in SINR and thus not be appropriate representatives for the cluster. Therefore, it may be inappropriate to create e.g., circular clusters as centroid-shaped cluster which may result in UEs located far from each other within the cluster. In this regard, the so-called Chameleon Algorithm can be utilized to establish non-circular clusters.

In an embodiment, the group of UEs being included in the cluster is selected to comprise a selected number of UEs being located within a maximum allowable distance from each other.

Other parameters may also be taken into account, such as e.g. Service Level Agreements (SLAs). For instance, a first cluster may comprise users being entitled to a higher quality of service as stipulated by the SLA as compared to users of a second cluster, in which case the RBS 101 may tilt the antenna 102 in a direction towards the first cluster. Further, this may be incorporated into the trained ML model, for instance by including the parameters in the feature space.

In practice, the RBS 101 may serve a number of clusters, which may create a possible conflict in tilt optimization. In an embodiment, this is dealt with using prioritization, for instance based on location of the cluster. For instance, a first cluster location indicating an enterprise may be given a higher priority than a second cluster location indicating a residential area.

In another example, a first cluster location closer to the RBS 101 as compared to a second cluster location will be given priority.

In yet another example, after the clusters are formed, certain weights may be associated with a cluster dependent on the types of services consumed by UEs in a cluster.

In an example, a first cluster containing 15 UEs has 10 UEs consuming enhanced Mobile Broadband (eMBB) services while the remaining 5 UEs consume Ultra-Reliable Low-Latency Communication (URLLC) services. In this example, eMBB is given weight 1 while URLLC is given weight 3. The priority weight of the first cluster is thus 10*1+5*3=25.

A second cluster containing 18 UEs has 16 UEs consuming eMBB services while the remaining 2 UEs consume URLLC services. The priority weight of the second cluster is thus 16*1+2*3=22.

In this example, the first cluster will be selected over the second cluster due to a higher weight value.

Further, during training of the RL model referred to in FIG. 2, it may be envisaged that a reward is given a higher weight for a UE of the first cluster as compared to a UE of the second cluster to learn the RL model that priority should be given the first-cluster UEs upon determining antenna tilt.

Figure 4:
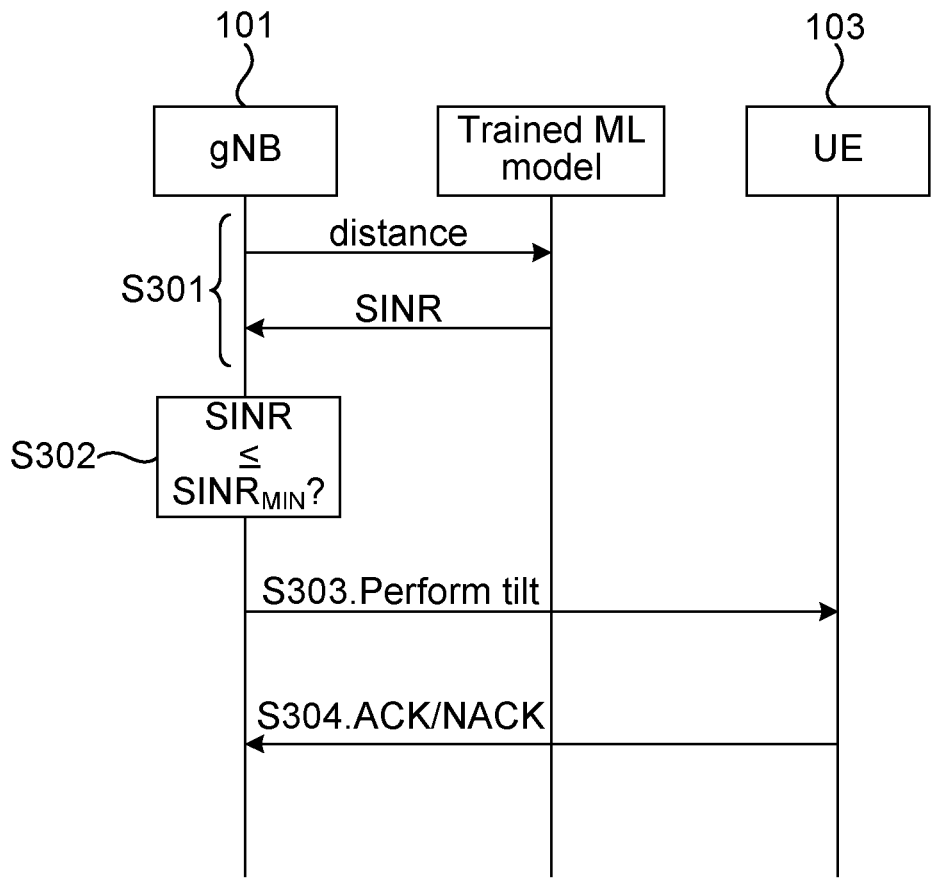
FIG. 4 shows a signalling diagram where the radio base station uses the trained ML model of FIG. 3 to control the tilt of the antenna according to some embodiments.

FIG. 4 shows a signalling diagram where the RBS uses the trained ML model to control the tilt of the antenna 102 according to an embodiment.

In step S301, the RBS 101 computes—using the trained ML model—an expected SINR for a group of UEs—possibly forming part of a determined cluster as previously described—on a particular distance from the RBS 101. Again, other measures of quality of a signal may be envisaged other than SINR, such as SNR, QoS, CQI, RSRQ, RSRP, etc.

In step S302, the RBS 101 determines whether or not the expected SINR is sufficiently high, i.e. if the expected SINR computed by the trained ML model exceeds a minimum SINR threshold value. That is, whether or not the expected $SINR > SINR_{MIN}$. If so, no change is made to the antenna tilt since signals sent to UEs at this distance from the RBS 101 are considered to have a sufficiently SINR.

To the contrary, if the expected SINR $SINR_{MIN}$, the RBS 101 changes the antenna tilt in step S303 and sends a signal to each UE in the group of UEs. The UEs will in response to the received signal measure the experienced SINR and transmit either an ACK or a NACK in step S304 to the RBS 101 depending on whether or not the experienced SINR is sufficiently high.

This will serve as a confirmation to the RBS 101 if the change in antenna tilt was successful or not. If ACKs are received (or at least a high enough number of ACKs), the RBS 101 concludes that the change in antenna tilt indeed was successful. If not, for instance if a great number of NACKs are received, a further change in antenna tilt is made until a successful antenna tilt is found. The antenna tilt may possibly be complemented with a change in transmission power.

Moreover, this confirmation to the RBS 101 may further serve as a reward to the trained ML model utilized by the RBS 101. If indeed the change in antenna tilt was successful, the RBS 101 applies reinforcement learning by providing the trained ML model with a reward indicating that the antenna tilt prediction of the ML model was correct.

It is noted that when determining whether or not to change antenna tilt of the RBS 101 as described with reference to FIG. 4, the decision is based on the location of a great number of UEs rather than a single UE. Assuming for instance that the cell 108 of the RBS 101 serves a mall; the decision to be made may then be whether the antenna is to be tilted towards a north part of the mall ("distance1") or towards a south part of the mall ("distance2"). In other words, the privacy of the UEs in terms UE position is maintained.

In a further embodiment, where UEs in the cell 108 served by the RBS 101 are categorized into clusters such as a first and a second cluster, UEs of one of the two clusters which is not within coverage of a first antenna 102 of the RBS 101 may be handed over to a second antenna of the RBS 101 or even to a neighbouring RBS to receive service from the neighbouring RBS.

This may occur if the antenna 102 is tilted sharply towards one of the two clusters such that the other cluster no longer is within the coverage of the antenna 102.

This may further occur if an antenna tilting mechanism is defect such that a required tilt cannot be performed which may leave a group of UEs without coverage.

Figure 5:
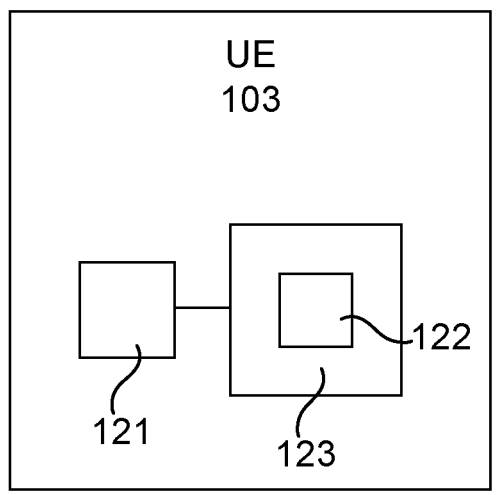
FIG. 5 illustrates a wireless communication device according to an embodiment.

FIG. 5 illustrates a wireless communication device 103, referred to as a UE, configured to facilitate control of antenna tilt according to an embodiment. The steps of the method performed by the UE 103 are in practice performed by a processing unit 121 embodied in the form of one or more microprocessors arranged to execute a computer program 122 downloaded to a suitable storage volatile medium 123 associated with the microprocessor, such as a Random Access Memory (RAM), or a non-volatile storage medium such as a Flash memory or a hard disk drive. The processing unit 121 is arranged to cause the UE 103 to carry out the method according to embodiments when the appropriate computer program 122 comprising computer-executable instructions is downloaded to the storage medium 123 and executed by the processing unit 121. The storage medium 123 may also be a computer program product comprising the computer program 122. Alternatively, the computer program 122 may be transferred to the storage medium 123 by means of a suitable computer program product, such as a Digital Versatile Disc (DVD) or a memory stick. As a further alternative, the computer program 122 may be downloaded to the storage medium 123 over a network. The processing unit 121 may alternatively be embodied in the form of a digital signal processor (DSP), an application specific integrated circuit (ASIC), a field-programmable gate array (FPGA), a complex programmable logic device (CPLD), etc.

Figure 6:
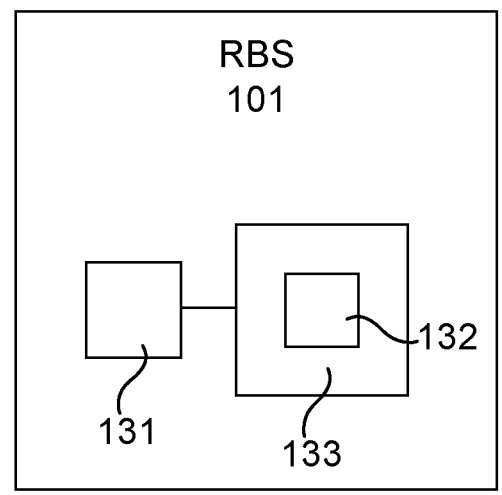
FIG. 6 illustrates a radio base station according to an embodiment.

FIG. 6 illustrates an RBS 101 configured to facilitate control of antenna tilt according to an embodiment. The steps of the method performed by the RBS 101 are in practice performed by a processing unit 131 embodied in the form of one or more microprocessors arranged to execute a computer program 132 downloaded to a suitable storage volatile medium 133 associated with the microprocessor, such as a RAM, or a non-volatile storage medium such as a Flash memory or a hard disk drive. The processing unit 131 is arranged to cause the RBS 101 to carry out the method according to embodiments when the appropriate computer program 132 comprising computer-executable instructions is downloaded to the storage medium 133 and executed by the processing unit 131. The storage medium 133 may also be a computer program product comprising the computer program 132. Alternatively, the computer program 132 may be transferred to the storage medium 133 by means of a suitable computer program product, such as a DVD or a memory stick. As a further alternative, the computer program 132 may be downloaded to the storage medium 133 over a network. The processing unit 131 may alternatively be embodied in the form of a DSP, an ASIC, an FPGA, a CPLD, etc.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of a wireless communication device of facilitating control of antenna tilt for a radio base station, comprising:
   receiving, from the radio base station, information indicating a location of the radio base station;
   determining a set of values of a measure of quality of a signal received from the radio base station and a distance of the wireless communication device from the location of the radio base station at which each value in the set is determined;
   supplying a machine learning model with the determined set of values of said measure of quality and the distance of the wireless communication device from the location of the radio base station for each value, thereby creating a trained machine learning model associating a distance of the wireless communication device from the location of the radio base station with a value of a measure of quality of a signal received from the radio base station; and
   transmitting the trained machine learning model to the radio base station, the trained machine learning model being used by the radio base station to control antenna tilt.

2. The method of claim 1, the received information further comprising one or more of information indicating type of machine learning model being utilized, information indicating feature space of the machine learning model being utilized, information indicating amount of resources to be allocated by the wireless communication device when training the machine learning model.

3. A non-transitory computer readable medium storing a computer program comprising a set of computer-executable instructions for causing a wireless communication device to perform the method of claim 1 when the computer-executable instructions are executed on a processing unit included in the wireless communication device.

4. A method of a radio base station of facilitating control of antenna tilt at the radio base station, comprising:
transmitting, to a selected group of wireless communication devices served by the radio base station, information indicating a location of the radio base station;
receiving, from each of at least a subset of the wireless communication devices in the group, a trained machine learning model associating a distance of said each wireless communication device from the location of the radio base station with a value of a measure of quality of a signal received from the radio base station at said each wireless communication device; and
aggregating the received trained machine learning models into a single trained machine learning model, which single trained machine learning model is used to control antenna tilt at the radio base station.

5. The method of claim 4, further comprising:
computing, utilizing the single trained machine learning model, an expected value of the measure of quality of a signal received from the radio base station by a wireless communication device at a particular distance from the radio base station;
determining whether or not the computed expected value exceeds a minimum threshold value for said measure of quality; and if not
changing tilt of the antenna of the radio base station.

6. The method of claim 5, further comprising:
receiving a response from one or more wireless communication devices indicating whether or not a value of the measure of quality of the signal received from the radio base station upon changing the tilt of the antenna exceeds the minimum threshold value for said measure of quality; and if not
changing tilt of the antenna of the radio base station until a response is received indicating that the value of the measure of quality of the signal exceeds the minimum threshold value.

7. The method of claim 4, further comprising:
selecting the group of wireless communication devices served by the radio base station to which information indicating a location of the radio base station is to be transmitted, the group being selected to comprise any one or more of: a selected number of wireless communication devices being in Radio Resource Control, RRC, connected state for a longest total time with the radio base station, wireless communication devices being located within a maximum allowable distance from each other, wireless communication devices having a particular Service Level Agreement, SLA, status, wireless communication devices being located closer to the radio base station as compared to another set of wireless communication devices, or wireless communication devices accessing a particular service.

8. The method of claim 4, further comprising:
effecting handover of a group of wireless communication devices not located within coverage of the antenna to another antenna of the radio base station or to a neighbouring radio base station.

9. The method of claim 4, further comprising:
acquiring a trained reinforcement learning model created during simulation, the reinforcement learning model created during simulation being trained to produce as output a value of the measure of quality of a signal received by a wireless communication device located on a particular distance from the radio base station.

10. A non-transitory computer readable medium storing a computer program comprising a set of computer-executable instructions for causing a radio base station to perform the method of claim 4 when the computer-executable instructions are executed on a processing unit included in the radio base station.

11. A wireless communication device configured to facilitate control of antenna tilt for a radio base station, the wireless communication device comprising a processing unit and a memory, said memory containing instructions executable by said processing unit, whereby the wireless communication device is operative to:
receive, from the radio base station, information indicating a location of the radio base station;
determine a set of values of a measure of quality of a signal received from the radio base station and a distance of the wireless communication device from the location of the radio base station at which each value in the set is determined;
supply a machine learning model with the determined set of values of said measure of quality and the distance of the wireless communication device from the location of the radio base station for each value, thereby creating a trained machine learning model associating a distance of the wireless communication device from the location of the radio base station with a value of a measure of quality of a signal received from the radio base station; and to
transmit the trained machine learning model to the radio base station, the trained machine learning model being used by the radio base station to control antenna tilt.

12. The wireless communication device of claim 11, the received information being configured to further comprise one or more of information indicating type of machine learning model being utilized, information indicating feature space of the machine learning model being utilized, information indicating amount of resources to be allocated by the wireless communication device when training the machine learning model.

13. The wireless communication device of claim 12, wherein the feature space further is configured to include model type for the wireless communication device.

14. The wireless communication device of claim 11, the measure of quality being one of signal-to-interference-plus-noise ratio, SINR, signal-to-noise ratio, SNR, Quality of Service, QoS, Channel Quality Indicator, CQI, Reference Signal Received Quality, RSRQ, and Reference Signal Received Power, RSRP.

15. A radio base station configured to facilitate control of antenna tilt at the radio base station, the radio base station comprising a processing unit and a memory, said memory containing instructions executable by said processing unit, whereby the radio base station is operative to:
transmit, to a selected group of wireless communication devices served by the radio base station, information indicating a location of the radio base station;
receive, from each of at least a subset of the wireless communication devices in the group, a trained machine learning model associating a distance of said each wireless communication device from the location of the radio base station with a value of a measure of quality of a signal received from the radio base station at said each wireless communication device; and to
aggregate the received trained machine learning models into a single trained machine learning model, which single trained machine learning model is used to control antenna tilt at the radio base station.

16. The radio base station of claim 15, further being operative to:
compute, utilizing the single trained machine learning model, an expected value of the measure of quality of a signal received from the radio base station by a wireless communication device at a particular distance from the radio base station;
determine whether or not the computed expected value exceeds a minimum threshold value for said measure of quality; and if not to change tilt of the antenna of the radio base station.

17. The radio base station of claim 16, further being operative to:
receive a response from one or more wireless communication devices indicating whether or not a value of the measure of quality of the signal received from the radio base station upon changing the tilt of the antenna exceeds the minimum threshold value for said measure of quality; and if not to
change tilt of the antenna of the radio base station until a response is received indicating that the value of the measure of quality of the signal exceeds the minimum threshold value.

18. The radio base station of claim 15, further being operative to:
select the group of wireless communication devices served by the radio base station to which information indicating a location of the radio base station is to be transmitted, the group being selected to comprise any one or more of: a selected number of wireless communication devices being in Radio Resource Control, RRC, connected state for a longest total time with the radio base station, wireless communication devices being located within a maximum allowable distance from each other, wireless communication devices having a particular Service Level Agreement, SLA, status, wireless communication devices being located closer to the radio base station as compared to another set of wireless communication devices, or wireless communication devices accessing a particular service.

19. The radio base station of claim 15, further being operative to:
effect handover of a group of wireless communication devices not located within coverage of the antenna to another antenna of the radio base station or to a neighbouring radio base station.

20. The radio base station of claim 15, further being operative to:
acquire a trained reinforcement learning model created during simulation, the reinforcement learning model created during simulation being trained to produce as output a value of the measure of quality of a signal received by a wireless communication device located on a particular distance from the radio base station.

* * * * *